(12) United States Patent
Dyer

(10) Patent No.: US 8,522,521 B2
(45) Date of Patent: Sep. 3, 2013

(54) COMBINED AIR TURBINE STARTER, AIR-OIL COOLER, AND FAN

(75) Inventor: Gerald P. Dyer, Enfied, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 327 days.

(21) Appl. No.: 12/942,520

(22) Filed: Nov. 9, 2010

(65) Prior Publication Data

US 2012/0111022 A1    May 10, 2012

(51) Int. Cl.
*F02C 3/00*    (2006.01)
*F02C 7/275*    (2006.01)
*F02C 7/22*    (2006.01)
*F02K 99/00*    (2009.01)

(52) U.S. Cl.
USPC ............ 60/39.08; 60/267; 60/788; 60/778

(58) Field of Classification Search
USPC ............ 60/788, 786, 39.08, 266, 267, 39.13, 60/778
See application file for complete search history.

(56) References Cited

U.S. PATENT DOCUMENTS

| | | | |
|---|---|---|---|
| 2,909,166 A | | 10/1959 | Cluff et al. |
| 4,077,202 A | * | 3/1978 | Schutze ............ 60/788 |
| 4,546,605 A | | 10/1985 | Mortimer et al. |
| 4,926,631 A | | 5/1990 | Sorenson |
| 5,363,641 A | | 11/1994 | Dixon et al. |
| 5,553,449 A | | 9/1996 | Rodgers et al. |
| 6,050,080 A | | 4/2000 | Horner |
| 6,305,156 B1 | | 10/2001 | Lui |
| 2007/0215326 A1 | | 9/2007 | Schwarz et al. |

FOREIGN PATENT DOCUMENTS

WO    2006059992 A1    12/2004

* cited by examiner

*Primary Examiner* — Gerald L Sung
(74) *Attorney, Agent, or Firm* — Kinney & Lange, P.A.

(57) ABSTRACT

An air turbine starter assembly includes a starter turbine housing having a turbine gas flow path and a fan gas flow path, and a shaft rotatable with respect to the starter turbine housing. A plurality of turbine blades are connected to the shaft. A plurality of fan blades are also connected to the shaft.

20 Claims, 3 Drawing Sheets

COMBINED AIR TURBINE STARTER, AIR-OIL COOLER, AND FAN

BACKGROUND

The present invention relates to gas turbine engines, and in particular, to air turbine starters on gas turbine engines. Gas turbine engines typically have at least one spool that includes a compressor and a turbine. When a gas turbine engine is burning fuel and operating, the spool rotates at a high speed without further assistance. However, when a gas turbine engine is started, the spool typically needs assistance to begin rotation. Various starters have been devised to start the spool rotating.

In some gas turbine engines, an air turbine starter is used to start rotation of the spool. The air turbine starter has a turbine which is typically connected to the spool via gearing. Compressed air is blown over the turbine of the air turbine starter, which causes the spool to rotate and start the gas turbine engine. After starting the gas turbine engine, the air turbine starter typically provides no useful function until the gas turbine engine needs to be started again. In the meantime, the air turbine starter just adds undesirable weight to a gas turbine engine, which is especially undesirable on an aircraft.

Gas turbine engines also typically have various components, such as gears and bearings, which benefit from lubrication and cooling. An oil supply system supplies oil, or another lubricating liquid, to and from the components to lubricate and cool the components. This oil is typically cooled by a heat exchanger positioned in a gas flow path. If the gas flow path has a relatively slow air flow, the heat exchanger typically needs to be relatively large and bulky to achieve the desired amount of cooling. A relatively large heat exchanger undesirably increases the weight of the aircraft. In gas turbine engines where the heat exchanger is positioned in a bypass flow stream of the engine's propulsion fan, the heat exchanger can also reduce overall thrust output.

SUMMARY

According to the present invention, an air turbine starter assembly includes a starter turbine housing having a turbine gas flow path and a fan gas flow path, and a shaft rotatable with respect to the starter turbine housing. A plurality of turbine blades are connected to the shaft. A plurality of fan blades are also connected to the shaft.

Another embodiment of the present invention includes a method of operating a starter turbine for use on a gas turbine engine. The method includes flowing compressed gas through a turbine gas flow path over turbine blades attached to a shaft to rotate the shaft, blowing air through a fan gas flow path via fan blades attached to the shaft, and cooling lubricating liquid via a heat exchanger positioned in the fan gas flow path.

DETAILED DESCRIPTION

Figure 1:
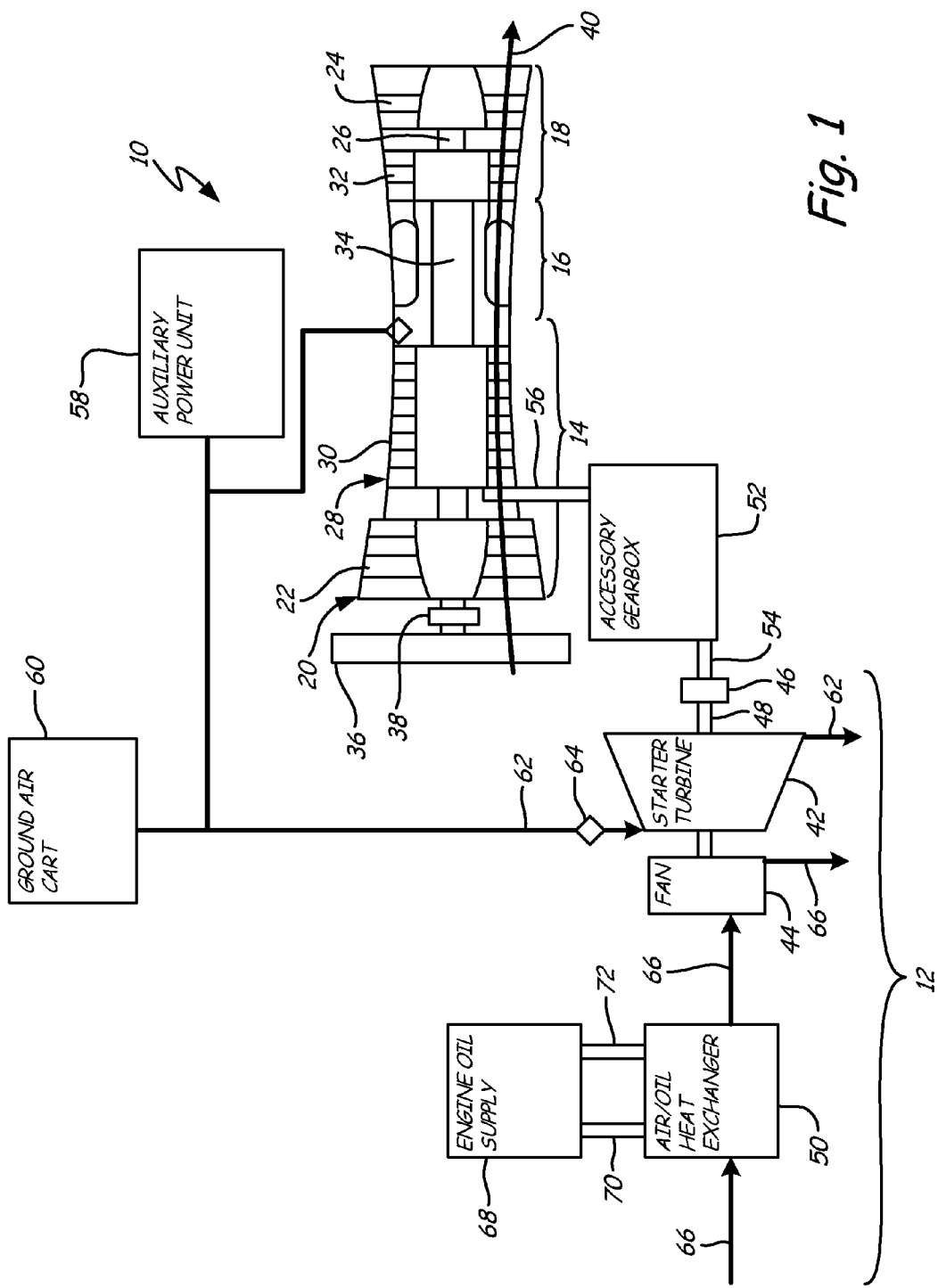
FIG. 1 is a schematic view of a gas turbine engine having a combination starter, air-oil cooler, and fan system.

FIG. 1 is a schematic view of gas turbine engine 10 having combination starter, air-oil cooler, and fan system 12 (combo system 12). Gas turbine engine 10 includes main compressor section 14, main combustor section 16, and main turbine section 18. Low pressure spool 20 (which includes low pressure compressor 22 and low pressure turbine 24 connected by low pressure shaft 26) and high pressure spool 28 (which includes high pressure compressor 30 and high pressure turbine 32 connected by high pressure shaft 34) each extend from main compressor section 14 to main turbine section 18. Propulsion fan 36 is connected to and driven by low pressure spool 20. A fan drive gear system 38 may be included between the propulsion fan 36 and low pressure spool 20. Air flows from main compressor section 14 to main turbine section 18 along engine gas flow path 40. The general construction and operation of gas turbine engines is well-known in the art, and therefore detailed discussion here is unnecessary.

Combo system 12 includes starter turbine 42, cooling fan 44, clutch 46 (all connected to shaft 48), and heat exchanger 50. Clutch 46 is connected to shaft 48 via gearing (illustrated in FIGS. 2 and 3), as further explained below with respect to FIG. 2. Accessory gearbox 52 is connected to clutch 46 by shaft 54 and to high pressure spool 28 by shaft 56. Clutch 46 selectively engages and disengages shaft 48 with shaft 54. In operation, starter turbine 42 receives a compressed gas, such as bleed air, from an air source, such as main compressor section 14, auxiliary power unit (APU) 58, or ground air cart 60. Air flows through starter turbine gas flow path 62 to rotate starter turbine 42, and consequently, rotate shaft 48. When clutch 46 is engaged, starter turbine 42 rotates shafts 54 and 56, and consequently, rotates high pressure spool 28. Gas turbine engine 10 can, therefore, be started by using combo system 12 to rotate high pressure spool 28 to a suitable speed before adding fuel to begin combustion in main combustor section 16.

Once gas turbine engine 10 is operating normally, clutch 46 can be disengaged, as it is no longer needed as a starter. Valve 64 can also be closed to reduce flow of air through starter turbine gas flow path 62 and starter turbine 42.

Alternatively, valve 64 can remain open, allowing air to flow through starter turbine 42 to rotate cooling fan 44. This causes cooling fan 44 to blow a gas, such as air, through cooling fan gas flow path 66. Cooling fan 44 can be rotated by flowing compressed air through starter turbine 42 from virtually any suitable air source, such as main compressor section 14. Cooling fan 44 and heat exchanger 50 are both positioned along cooling fan gas flow path 66, with heat exchanger 50 being upstream of cooling fan 44. As cooling fan 44 pulls air over heat exchanger 50, oil in heat exchanger 50 is cooled by that air. Valve 64 can be selectively opened and closed to control rotational speed of starter turbine 42 and cooling fan 44, thus controlling air flow over heat exchanger 50. Therefore, air flow over heat exchanger 50 can be adjusted depending on cooling requirements.

In further alternative, clutch 46 can remain engaged, causing high pressure spool 28 to drive shaft 48 and cooling fan 44 through accessory gearbox 52. In that case, cooling fan 44 can blow air through cooling fan gas flow path 66 with or without a continued source of compressed air through starter turbine gas flow path 62.

Heat exchanger 50 is fluidically connected to engine oil supply 68 by supply line 70 and return line 72. Heat exchanger 50 receives warm oil from engine oil supply 68 along supply line 70, and returns cool oil to engine oil supply 68 along return line 72. Engine oil supply 68 supplies oil to and scavenges oil from various gears, bearings, and other components of gas turbine engine 10, including accessory gearbox 52 and optionally, fan drive gear system 38.

Thus, combo system 12 can be used as an air turbine starter to start gas turbine engine 10 and also as a fan to cool oil in engine oil supply 68 of gas turbine engine 10.

Figure 2:
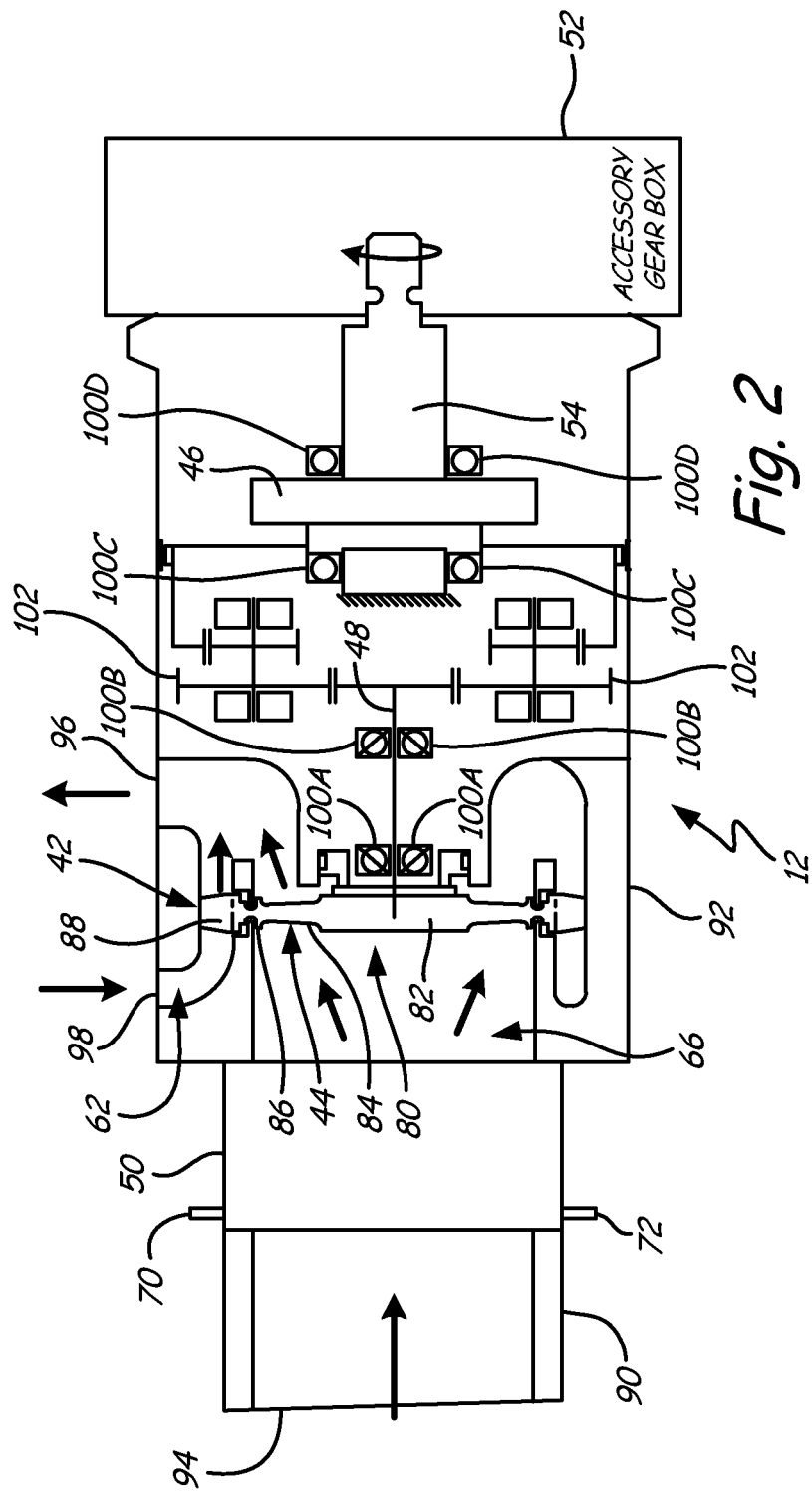
FIG. 2 is schematic view of the combination starter, air-oil cooler, and fan system of FIG. 1.

FIG. 2 is schematic view of combo system 12. Starter turbine 42 and cooling fan 44 combine to form wheel 80. Wheel 80 includes hub 82, cooling fan 44 including a plurality of fan blades 84, support ring 86, and starter turbine 42 including a plurality of turbine blades 88. Hub 82 is positioned substantially in the center of wheel 80, and connects wheel 80 to shaft 48. Fan blades 84 are connected to and extend substantially radially outward from hub 82 to support ring 86. Turbine blades 88 are connected to and extend substantially radially outward from support ring 86. Thus, hub 82, cooling fan 44 including fan blades 84, support ring 86, and turbine 42 including turbine blades 88 are all connected to and substantially integrally formed with shaft 48. In another embodiment, one or more components of wheel 80 can be connected, but not necessarily integrally formed with the other components.

In the illustrated embodiment, fan supply duct 90 is connected to heat exchanger 50, which is attached directly to starter housing 92. In an alternative embodiment, heat exchanger 50 can be spaced from starter housing 92 by a portion of fan supply duct 90. Starter housing 92 defines portions of both cooling fan gas flow path 66 and starter turbine gas flow path 62. Cooling fan gas flow path 66 includes fan inlet 94 and outlet 96. Fan blades 84 of cooling fan 44 are positioned in cooling fan gas flow path 66. Air flows from fan inlet 94, through heat exchanger 50, through cooling fan 44, and exits outlet 96. Starter turbine gas flow path 62 includes starter turbine inlet 98 and outlet 96. Turbine blades 88 of starter turbine 42 are positioned in starter turbine gas flow path 62. Air flows from starter turbine inlet 98, through starter turbine 42, and out outlet 96. In the embodiment illustrated in FIG. 2, starter turbine gas flow path 62 is substantially radially outward from cooling fan gas flow path 66, yet both share the same outlet 96. Air from outlet 96 can be ducted to provide thrust or otherwise exhausted to atmosphere.

Bearings 100A-100D support shafts 48 and 54 and allow shafts 48 and 54 to rotate with respect to starter housing 92. Wheel 80 and clutch 46 are connected to opposite ends of shaft 48. Clutch 46 is connected to shaft 48 via gearing 102. In the illustrated embodiment, clutch 46 is a ratchet and pawl clutch. In other embodiments, clutch 46 can be virtually any clutch suitable for engaging and disengaging shaft 48 with shaft 54. In either case, clutch 46 allows wheel 80 to rotate with high pressure spool 28 or to rotate independently from high pressure spool 28, as desired.

Figure 3:
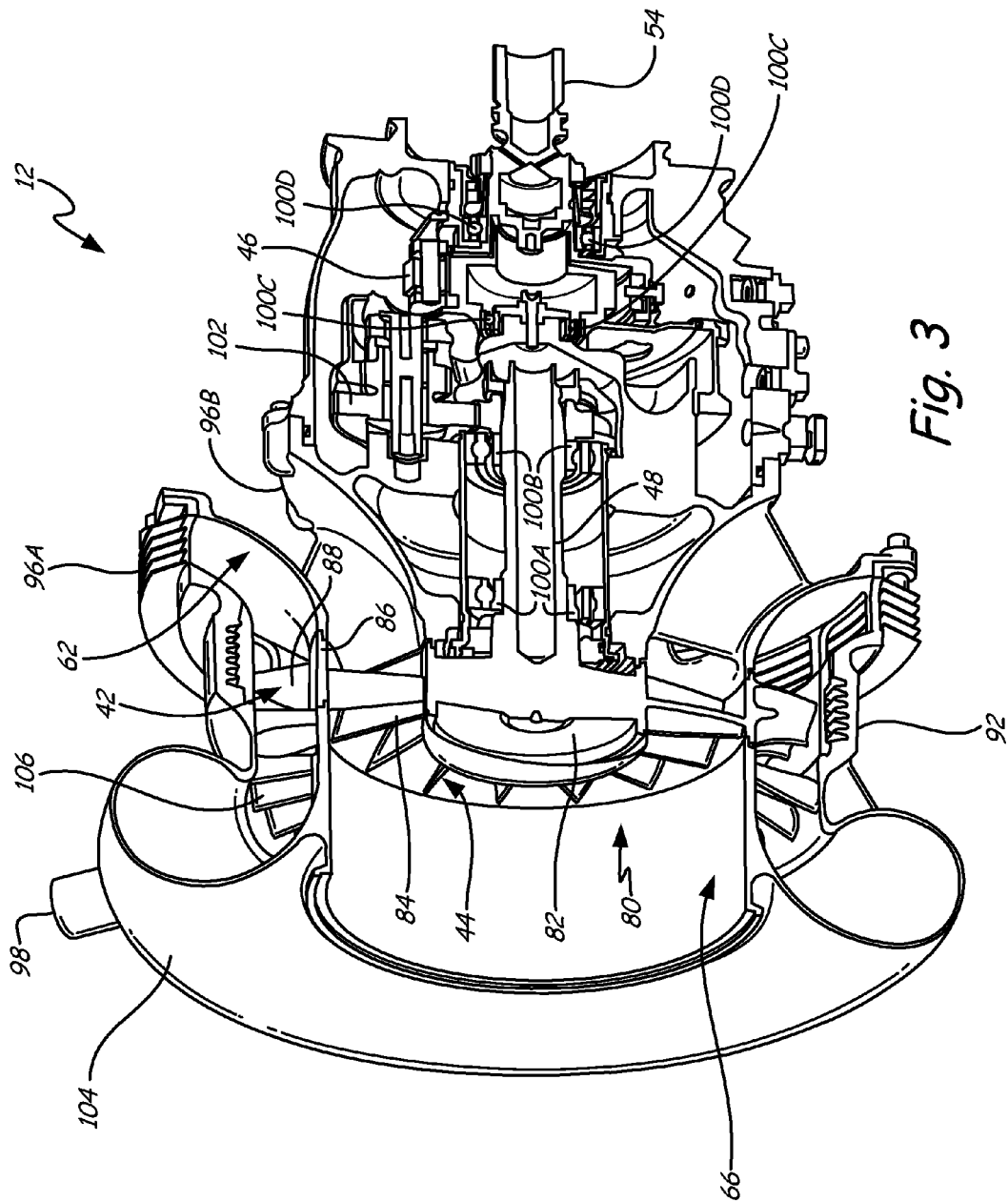
FIG. 3 is a perspective cross sectional view the combination starter, air-oil cooler, and fan system of FIG. 1.

FIG. 3 is perspective cross sectional view of one embodiment of combo system 12. FIG. 3 shows combo system 12 without heat exchanger 50, fan supply duct 90, or accessory gearbox 52 being attached. In the illustrated embodiment, outlet 96 (shown in FIG. 2) is split into two outlets: starter turbine outlet 96A and cooling fan outlet 96B. Starter turbine inlet plenum 104 is positioned along starter turbine gas flow path 62 between starter turbine inlet 98 and starter turbine outlet 96A. Starter turbine inlet plenum 104 has a substantially torus shape with a hollow interior for holding compressed air prior to that air flowing through starter turbine 42. Stators 106 are positioned along starter turbine gas flow path 62 upstream of starter turbine 42 to straighten flow of air through starter turbine 42.

In the illustrated embodiment, turbine blades 88 are substantially radially outward from and axially aligned with fan blades 84. In alternative embodiments, turbine blades 88 and fan blades 84 can be connected to shaft 48 in virtually any suitable manner so long as turbine blades 88 are positioned in starter turbine gas flow path 62 and fan blades 84 are positioned in cooling fan gas flow path 66.

Combo system 12 can be used not only to start gas turbine engine 10 but also to cool oil in engine oil supply 68 of gas turbine engine 10. By attaching cooling fan 44 to shaft 48, cooling fan 44 can be driven by starter turbine 42, by high pressure spool 28, or by both. By using cooling fan 44 to increase air flow through heat exchanger 50, heat exchanger 50 can be relatively small, while still providing the same amount of cooling as that of a larger heat exchanger having less air flow. Having a relatively small heat exchanger 50 allows the overall weight of gas turbine engine 10 to be relatively small. Using cooling fan 44 to draw air through heat exchanger 50 also allows for heat exchanger 50 to be positioned in locations other than in a bypass flow stream of propulsion fan 36, thus increasing the effective thrust of propulsion fan 36. Combining starter turbine 42 and cooling fan 44 together allows for engine starting and oil cooling to be performed by one relatively simple, small, and light-weight system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, the various flow paths need not be shaped precisely as illustrated, so long as starter turbine 42 and cooling fan 44 are both suitably connected to shaft 48 as part of combo system 12.

The invention claimed is:

1. An air turbine starter assembly comprising:
   a starter turbine housing having a turbine gas flow path and a fan gas flow path;
   a shaft rotatable with respect to the starter turbine housing;
   a plurality of turbine blades connected to the shaft and positioned in the turbine gas flow path;
   a plurality of fan blades connected to the shaft and positioned in the fan gas flow path, and
   a heat exchanger positioned in the fan gas flow path for cooling lubricating liquid flowing through the heat exchanger via air flowing through the fan gas flow path.

2. The air turbine starter assembly of claim 1, wherein the heat exchanger is connected to the starter turbine housing upstream of the fan blades along the fan gas flow path.

3. The air turbine starter assembly of claim 1, and further comprising:
   an accessory gearbox connecting the shaft to a high pressure spool of a gas turbine engine.

4. The air turbine starter assembly of claim 3, and further comprising:
   a clutch connected between the shaft and the accessory gearbox.

5. The air turbine starter assembly of claim 1, wherein the turbine gas flow path includes a turbine gas flow path inlet for receiving compressed air to drive the starter turbine and rotate the shaft, and wherein the fan gas flow path includes a fan gas flow path inlet for supplying air to the fan blades as the shaft rotates the fan.

6. The air turbine starter assembly of claim 1, wherein the turbine gas flow path is connected to an auxiliary power unit for receiving air from the auxiliary power unit.

7. The air turbine starter assembly of claim 1, wherein the turbine gas flow path is connected to a compressor section of a gas turbine engine for receiving air from the compressor section.

8. The air turbine starter assembly of claim 1, wherein the heat exchanger is fluidically connected to a supply of lubricating liquid for a gas turbine engine.

9. An air turbine starter assembly comprising:
   a starter turbine housing having a turbine gas flow path and a fan gas flow path;
   a shaft rotatable with respect to the starter turbine housing; and
   a combination fan and turbine wheel attached to the shaft, the combination fan and turbine wheel including:
      a plurality of fan blades connected to the shaft and extending substantially radially outward to a support ring; and
      a plurality of turbine blades extending substantially radially outward from the support ring; and
   a heat exchanger positioned in the fan gas flow path for cooling lubricating liquid flowing through the heat exchanger via air flowing through the fan gas flow path.

10. The air turbine starter assembly of claim 9, and further comprising:
    a clutch connected to an end of the shaft opposite the combination fan and turbine wheel.

11. The air turbine starter assembly of claim 9, wherein the plurality of turbine blades are substantially radially outward from and axially aligned with the plurality of fan blades.

12. The air turbine starter assembly of claim 9, wherein the turbine blades, the fan blades, the support ring, and the shaft are integrally formed.

13. A method of operating a starter turbine for use on a gas turbine engine, the method comprising:
    flowing compressed gas through a turbine gas flow path over turbine blades attached to a shaft to rotate the shaft;
    blowing air through a fan gas flow path via fan blades attached to the shaft; and
    cooling lubricating liquid the air flowing through via a heat exchanger positioned in the fan gas flow path.

14. The method of claim 13, and further comprising:
    flowing warm lubricating liquid from components of the gas turbine engine to the heat exchanger; and
    flowing cool lubricating liquid from the heat exchanger to the components of the gas turbine engine.

15. The method of claim 13, and further comprising:
    rotating a high pressure spool of the gas turbine engine via an accessory gearbox driven by the shaft.

16. The method of claim 15, and further comprising:
    rotating the shaft via the accessory gearbox driven by the high pressure spool.

17. The method of claim 15, and further comprising:
    engaging and disengaging a clutch connecting the shaft to the accessory gearbox.

18. The method of claim 17, and further comprising:
    disengaging the clutch; and
    blowing bleed air from a compressor section of the gas turbine engine through the turbine gas flow path to drive the shaft to blow air through the fan gas flow path.

19. The method of claim 17, and further comprising:
    engaging the clutch; and
    blowing air through the turbine gas flow path to drive the shaft to rotate a high pressure spool.

20. The method of claim 13, and further comprising:
    adjusting the flow of compressed gas through the turbine gas flow path via a valve in order to adjust the flow of air blown by the fan blades through the fan gas flow path.

\* \* \* \* \*